United States Patent [19]
Magnuson et al.

[11] 3,787,723
[45] Jan. 22, 1974

[54] VEHICULAR DRIVE SYSTEM WITH ELECTRIC ASSIST

[75] Inventors: Lee T. Magnuson, Davenport, Iowa; Alexander Kusko, Newton Centre, Mass.

[73] Assignee: Deere & Company, Moline, Ill.

[22] Filed: Mar. 2, 1970

[21] Appl. No.: 20,262

Related U.S. Application Data

[62] Division of Ser. No. 730,541, May 20, 1968.

[52] U.S. Cl. ............................................. 318/230
[51] Int. Cl. ............................................. H02p 5/28
[58] Field of Search .... 318/227, 230, 237, 241, 242

[56] References Cited
UNITED STATES PATENTS

| | | | |
|---|---|---|---|
| 3,348,110 | 10/1967 | Koppelmann | 318/230 |
| 3,372,323 | 3/1968 | Guyfeska | 318/230 |
| 3,394,297 | 7/1968 | Risberg | 318/230 |
| 3,526,816 | 9/1970 | Paice | 318/230 |
| 3,343,063 | 9/1967 | Keeney | 318/230 |

*Primary Examiner*—Bernard A. Gilheany
*Assistant Examiner*—Thomas Langer

[57] ABSTRACT

A vehicle is equipped with a main drive system and an electric assist drive system which is actuated by the operator when the vehicle speed falls below some predetermined speed. A prime mover for the vehicle, in addition to driving two wheels directly through a primary transmission, drives a three-phase electrical alternator. The alternator energizes an induction motor with a torque-regulating control system for independently driving two other wheels of the vehicle to provide greater traction at low speeds. The rotor circuit of the induction motor includes a rectifier bridge which feeds a line-commutated inverter for coupling the slip power back to the stator input. The control system determines the firing angle for conduction of the switches in the inverter to control the output torque of the induction motor as a function of speed. The system includes a shaping network which defines the desired speed-torque characteristic for accelerating the vehicle; and it generates a signal representative of a demand torque for a given motor speed. Another circuit sensing rotor current generates a signal representative of the load torque. A comparison circuit receives the two signals representative respectively of the actual torque and the desired torque for that speed; and it generates an error signal for controlling the firing angle of the switches in the inverter circuit such that the motor and vehicle are accelerated along the torque-speed envelope of the shaping network once the assisting system is actuated. Thus, the control system regulates the output torque of the assisting induction motor as a predetermined function of vehicle speed.

10 Claims, 11 Drawing Figures

PATENTED JAN 22 1974 3,797,723
SHEET 1 OF 4
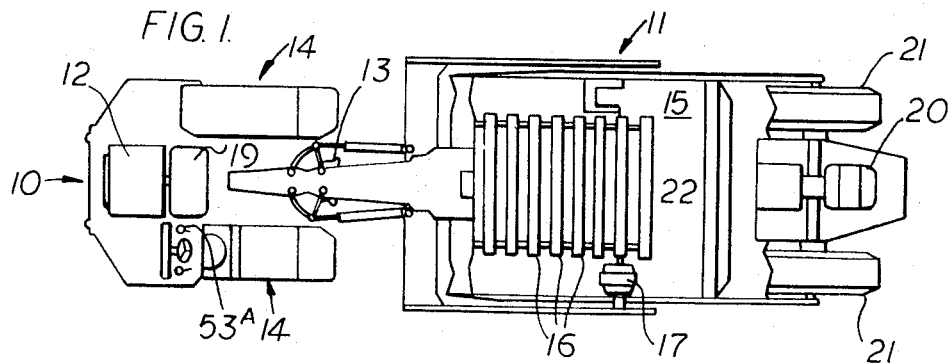
FIG. 1.
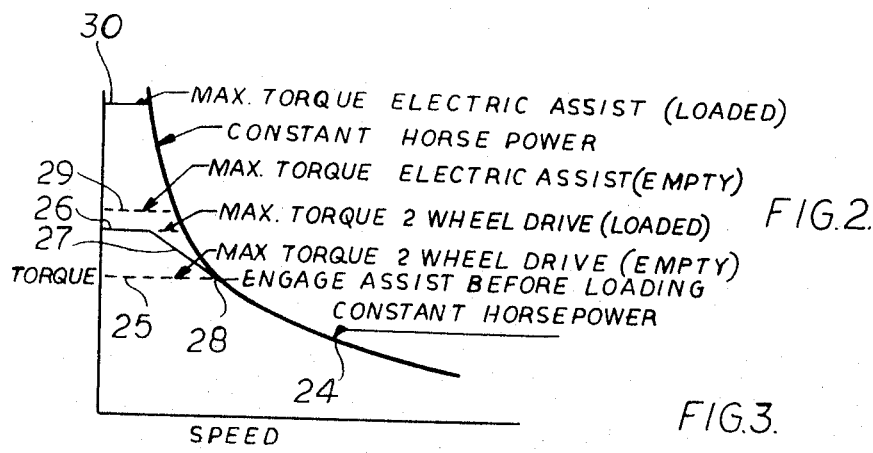
FIG. 2.
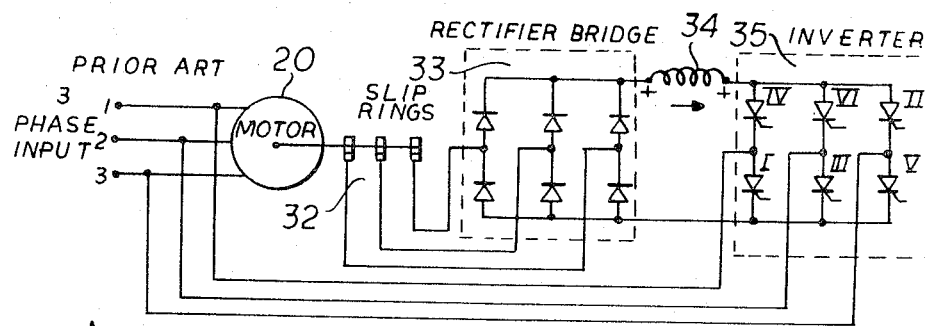
FIG. 3.
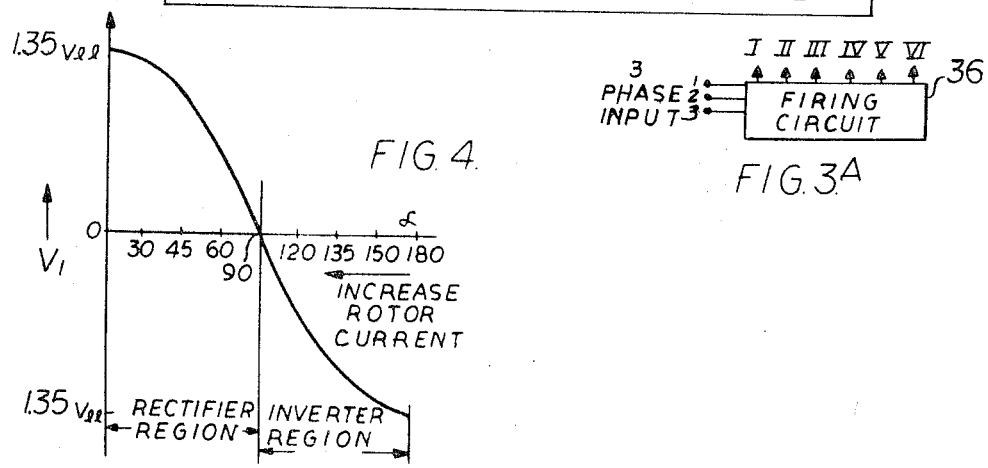
FIG. 4.
FIG. 3A.

3,797,723
FIG. 5.
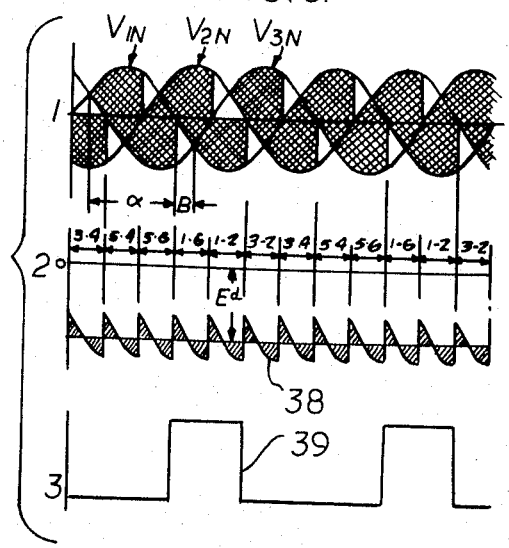
FIG.6
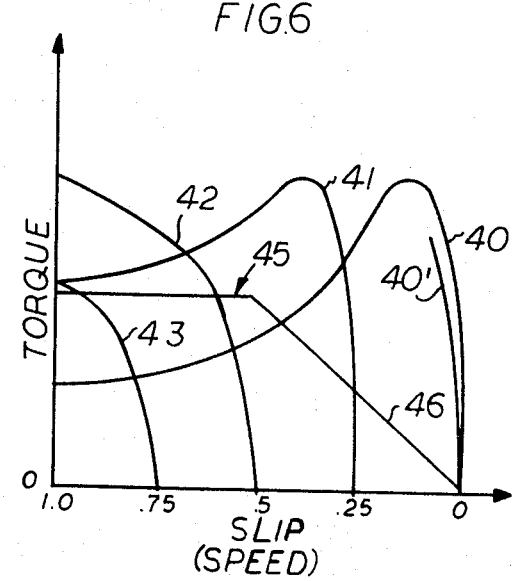
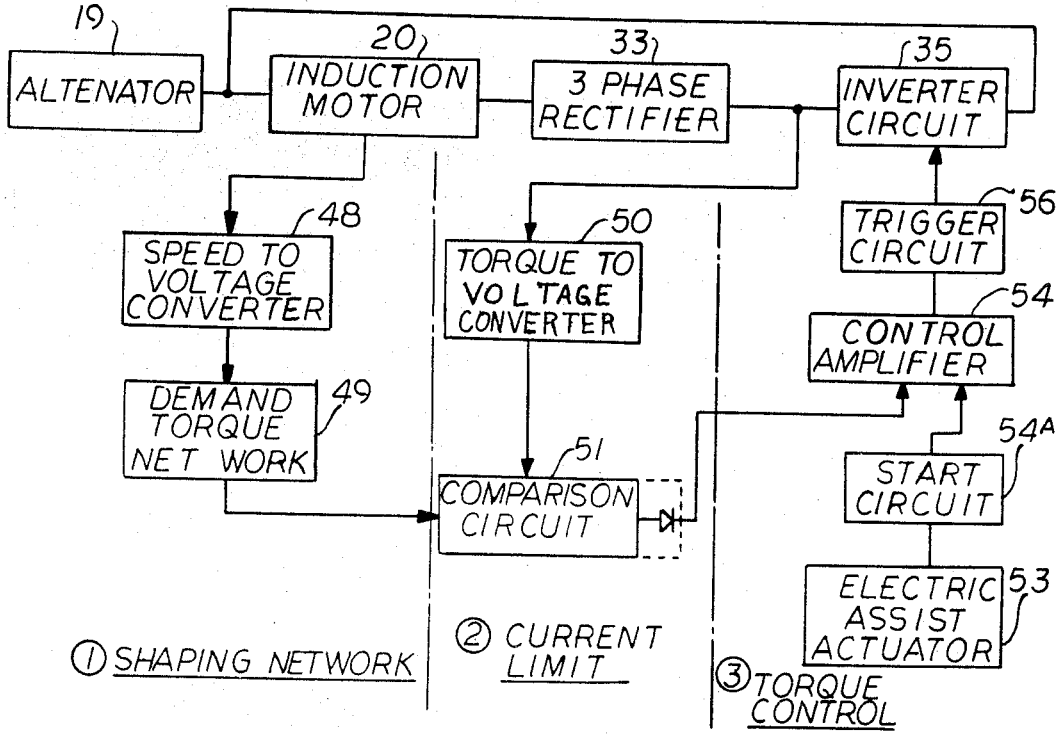
FIG. 7.

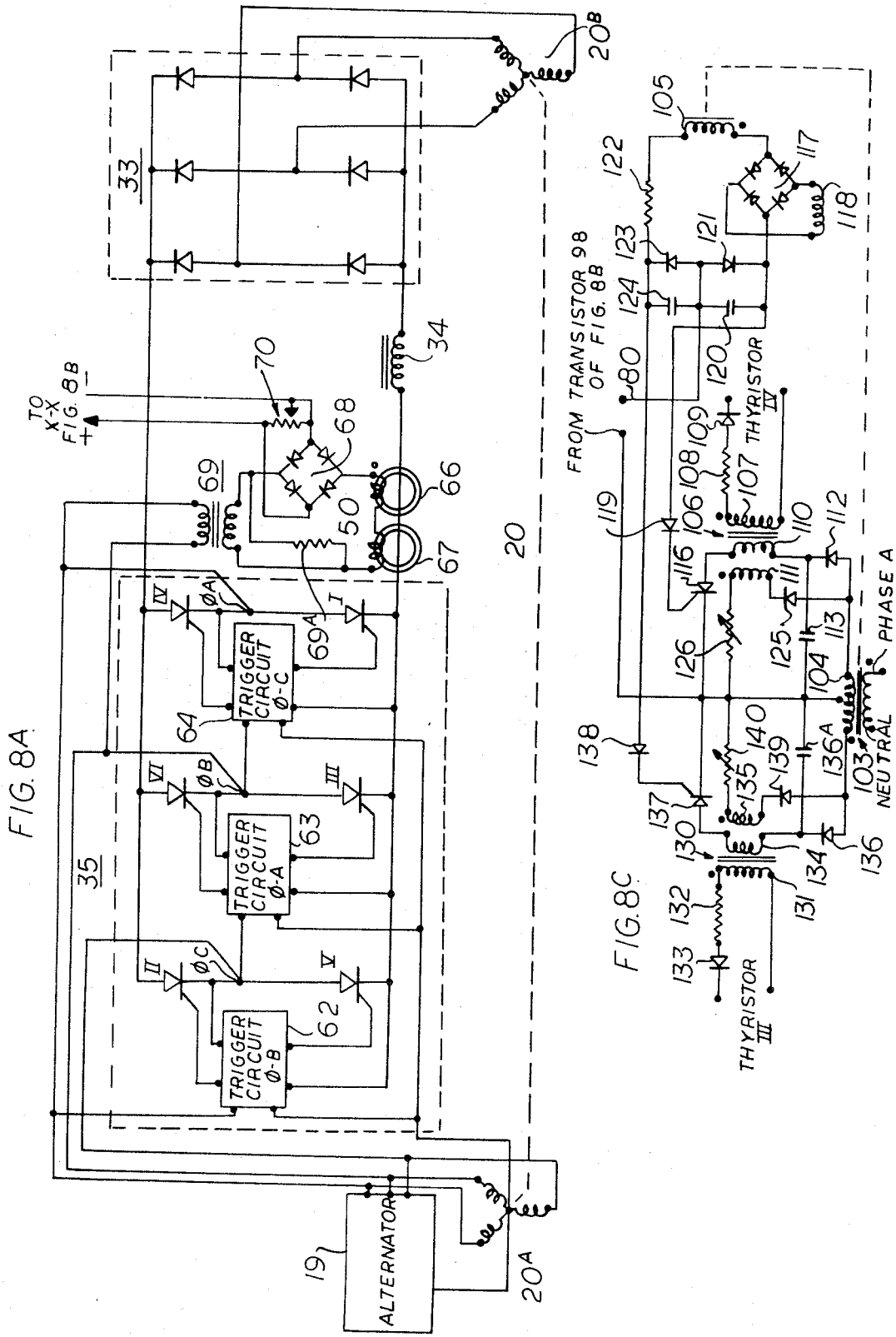

3,787,723

VEHICULAR DRIVE SYSTEM WITH ELECTRIC ASSIST

RELATED APPLICATION

This is a divisional application of application S.N. 730,541, for VEHICULAR DRIVE SYSTEM WITH ELECTRIC ASSIST, Filed May 20, 1968.

BACKGROUND

The present invention relates to adjustable-speed motor drive systems for vehicles; more particularly, it relates to an electric assist for a constant horsepower vehicular drive system, sometimes referred to as a traction drive system.

In a non-vehicular, adjustable-speed motor drive system, the maximum horsepower to which a motor can be loaded is determined by the heat limitations of the motor and drive components and the inherent torque limit of the motor. The amount of power drawn from a utility supply line is usually not a major consideration. The situation is different for a vehicle drive system wherein the only power source is a prime mover such as a gas turbine engine. The maximum horsepower which the motor can transmit to the wheels is limited by the capability of the prime mover.

Typically, however, especially at low speeds, a vehicle drive system is traction limited (that is, although additional horsepower is available, it is not delivered due to wheel slip); at the higher speeds, it is horsepower limited.

Many vehicles such as earthmoving scrapers carry nearly fifty percent of the load on unpowered wheels. The remainder of the vehicle weight is supported by wheels which are powered by a conventional mechanical transmission which is herein sometimes referred to as the primary transmission. Systems have been built in which an auxiliary engine and transmission is used to drive the previously unpowered wheels; however, in such a system synchronization between the primary and the auxiliary engines and transmissions is usually attained by their gear ratios; and this represents a significant problem in synchronizing the engines to run at the proper speeds.

SUMMARY

In the present invention, an electric assist transmission powers the previously unpowered wheels of a vehicle. The electric assist transmission is selectively activated by an operator during high drawbar pull conditions - that is, when the primary transmission is torque-limited by the traction limit of the wheels driven by the primary transmission. When activated, the electric assist accelerates the electric motor and the vehicle as pre-determined by the envelope of the speed-torque characteristic stored in the shaping network which may vary from application to application. The electric assist is automatically disengaged when it is possible to transmit all of the available engine horsepower through the primary transmission (i.e. when the vehicle has reached sufficient speed so that excessive slip does not occur).

The electric assist system includes an alternator driven by the prime mover, a wound-rotor induction motor for driving the two rear wheels, an inverter for receiving rectified rotor current and coupling it back to the stator input, and a control system for controlling the inverter switches such that the output torque of the electric motor is a predetermined function of vehicle speed.

The system nearly doubles the maximum drawbar pull capacity of the vehicle, and makes it possible to utilize more engine horsepower at low vehicle speeds.

As distinguished from other multiple transmission vehicles, such as locomotives, the present assist system does not operate continuously, but only over the low speed range and when actuated by an operator. The present system has advantages over those which use DC motors in that mechanical commutation is a problem; and thus, the motor can operate at higher speeds and therefore be smaller. The present system has advantages over systems for speed control of squirrel-cage induction motors in the simplicity of its control circuitry. Further, more than one auxiliary transmission can be used in accordance with the invention.

Further objects and advantages of the present invention will be apparent to persons skilled in the art from the following detailed description accompanied by the attached drawing illustrating a preferred embodiment of the invention.

DRAWING

FIG. 1 is a schematic plan view of an earthmoving scraper incorporating the present invention;

FIG. 2 illustrates the speed-torque characteristic of the vehicle of FIG. 1;

Figure 8B:
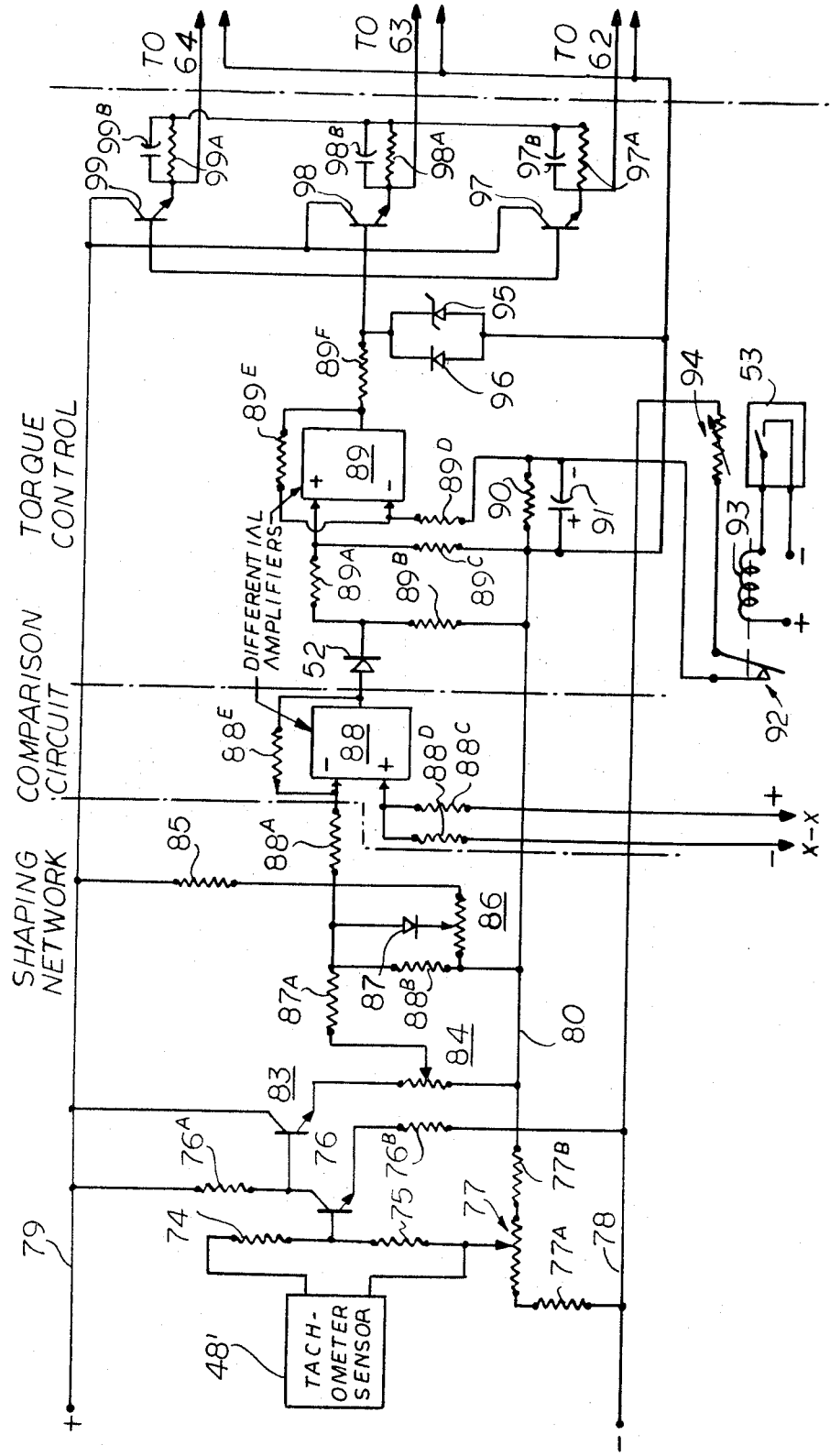

FIGS. 3 and 3A schematically illustrate a system having an induction motor with a line-commutated inverter in its rotor circuit and the firing circuit therefor;

FIG. 4 is a plot of firing angle vs. applied voltage for a commutating switch;

FIG. 5 illustrates various voltage and current waveforms for the inverter of FIG. 3;

FIG. 6 is a plot of speed-torque characteristics for the system of FIG. 3 with a superimposed speed-torque demand characteristic incorporated by the present invention;

FIG. 7 is a functional block schematic diagram of an electric assist control system according to the present invention; and FIGS. 8A–8C are detailed circuit schematic diagrams of the control system of FIG. 7.

DETAILED DESCRIPTION

Although it is not so limited, the present invention is preferably used to assist the main drive system for an earthmoving scraper. In order to better understand the invention, reference is made to FIG. 1 showing a scraper adapted to incorporate the invention. The principal elements of the scraper with which the present invention are concerned are a tractor generally designated 10, and an elevating scraper generally designated 11. The tractor 10 is equipped with a prime mover 12, which may be a conventional gas turbine engine, and which drives a primary transmission 13 for applying traction to wheels 14. The transmission 13 may be a conventional power shift transmission.

The scraper 11 is provided with a bowl 15 for receiving earth and a plurality of flights 16 for performing the actual scraping operation. The flights 16 are powered by a hydraulic motor 17 which, in turn, is energized by the prime mover 12. Earthmoving scrapers including the above described elements are known and commercially available.

The present invention contemplates that the prime mover 12, in addition to driving the primary transmission 13, also drive an alternator 19 to energize an induction motor 20 mounted above the rear wheels 21 on which most of the weight of the scraper 11 is carried. The electric assist (that is, the energizing of the induction motor 20) is designed primarily to be called into use at the low speed range for the vehicle whereby it becomes a four-wheel drive system. The improved characteristic of the type of the system of FIG. 1 is shown in FIG. 2.

In FIG. 2, the heavier curve 24 is a rectangular hyperbola representative of an idealized constant horsepower output of the prime mover 12. The dashed line 25 represents the maximum torque capable of being transmitted to the wheels 14 when the bowl 15 is empty; and the solid line 26 represents the maximum torque for the two-wheel drive system when the bowl is loaded. A solid line 27 joining the line 26 with the curve 24 represents a portion of the speed-torque characteristic of a vehicle under various loads. Hence, the characteristics formed by the lines 26 and 27 together with the lower portion of the constant horsepower curve 24 define the boundary for a speed-torque range for the two-wheel drive system.

The present invention contemplates engaging or actuating the electric assist at some speed, for example, the speed represented by the point 28 (the low traction limit speed) on the curve 24 to apply additional torque to the previously undriven wheels 21. In this situation, the dashed line 29 represents the maximum torque electric-assist the electri-assist system with an empty scraper; the line 30 represents the maximum torque for the electric-assist system when the scraper is loaded, and the area between the solid line 30 and line 26 represents the operation region for the system. In other words, the constant-horsepower curve 24 is extended up to the line 30 to define the range over which the improved system may operate. There will, of course, be some maximum speed beyond which the primary transmission 13 may not be driven; however, this does not concern the present invention.

The motor 20 of FIG. 1 is a wound-rotor induction motor with a line commutated inverter in its rotor circuit. Induction motor systems of this kind for constant torque output are known; one wiring schematic for such a system is illustrated in FIG. 3.

In FIG. 3, a three-phase voltage source is coupled directly to the stator winding of the motor 20; and the rotor windings are brought out through the slip-ring assembly generally designated 32. A three-phase rectifier bridge, generally designated 33 and enclosed within dashed line in FIG. 3, receives the rotor current flowing through the slip rings 32 and generates a DC rotor current flowing through an inductor 34 in the direction of the arrow into the positive terminal of an inverter circuit 35 (also enclosed within dashed line).

The inverter 35 is a three-phase inverter connected in circuit according to known technology; and it includes six silicon controlled rectifiers or thyristors, which term herein is to be taken broadly so as to include all equivalents. The three output leads of the inverter 35 are coupled directly back to the appropriate phase of the source which feeds the stator of the motor 20. The firing order of the thyristors of the inverter 35 is identified by a roman numeral (I-VI) associated with each one; and a firing circuit 36 (FIG. 3A) having six separate output leads (one connected respectively to the gate terminals of each of the thyristors in the inverter 35) determines the firing order and timing of the inverter 35.

It will be helpful in understanding the present invention to realize certain characteristics of a woundrotor induction motor system with a line-commutated inverter. The speed of an induction motor may be varied by varying the frequency of the stator supply voltage, by varying resistance in the rotor circuit, or by generating a back emf in the rotor circuit. The torque-speed characteristic of an induction motor in which the rotor resistance is increased has the effect of decreasing the slope of the operating characteristic over the operating range (see the curve 40' in FIG. 6). This type of control is inefficient because of the power loss in the rotor resistance.

In a line-commutated inverter control system, the inverter couples the slip power back to the AC supply line by adjusting the firing angle of the switches in the inverter. The commutation problem is not a significant one; and the motor always operates at the same input frequency thereby obviating the need to vary the input voltage.

The firing circuit 36 provides a source for predetermining the phase (relative to some time base supplied by the primary source) of the firing angle for the thryistors. Hence, the firing circuit 36 also receives an input from the three-phase primary source. The DC terminal voltage of the inverter at a fixed AC voltage is proportional to the cosine of the firing angle, $\alpha$:

$$V_i = 1.35\ V_{ll}\ (\cos \alpha) \qquad (1)$$

where, $V_i$ is the DC input terminal voltage to the inverter;
$V_{ll}$ is the line-to-line output voltage; and
$\alpha$ is the firing or conduction angle for the thyristors.

It will be noted that the firing angle, $\alpha$, is customarily measured from the point at which the line-to-line voltage is 60°, so that $\alpha = 0°$ corresponds to the normal full rectifier output voltage.

FIG. 4 shows the inverter input voltage, $V_i$, as a function of the firing angle of the switches; and it will be observed that for a positive input voltage (that is, the angle $\alpha$ is between 0° and 90°) the network acts as a rectifier, whereas when $\alpha$ is in the range between 90° and 180°, the network is properly in the inverter region.

When the firing angle is 180° and the dc input voltage is 1.35 times the rms line-to-line voltage, there is no output current from inverter to the ac line; and as the firing angle $\alpha$ decreases from 180°, current begins to flow through the inverter back to the ac line. Hence, as illustrated by the horizontal arrow in FIG. 4, a decrease in $\alpha$ generates an increase in rotor current and output torque.

Turning now to FIG. 5, there is shown three idealized line diagrams illustrating the voltage waveforms of thyrstir I for the case when $\alpha$ is 150°. The first line of FIG. 5 shows the voltage waveforms for the three supply lines. As illustrated, the angle $\alpha$ is measured from a point at which the voltage from line 1 to line 2 is at 60°. For reliable inverter operation, the minimum extinction angle, $\beta$, must be such as to provide the negative voltage on thyristor I at least for sufficient time to accomplish complete commutation of all possible AC line voltage disturbances and the maximum load current. In line 2 of FIG. 5, $E_d$ represents the average voltage output from the rectifier bridge 33 of FIG. 3; and the sequence of smaller numbers at the top line 2 indicates the individual thyristors of the inverter 35 which are then conducting.

The waveform designated by reference numeral 38 is the reverse voltage across the input terminals to the inverter 35. In line 3 of FIG. 5, the waveform designated by reference numeral 39 is representative of the current flowing in thyristor I. Once a thyristor is fired, it remains in a conducting state for 60°, and each thyristor conducts for two consecutive 60° intervals for a total of 120°. Additional information concerning the design and operation of inverter circuits may be found in a book entitled PRINCIPLES OF INVERTER CIRCUITS, by Bedford and Hoft, John Wiley & Sons, Inc. New York, 1964 - particularly in Chapter 3.

Turning now to FIG. 6, there is shown a family of characteristic speed-torque (slip speed in RPM is equal to the synchronous speed minus the actual speed) curves for various values of cos α. The individual curves are designated 40, 41, 42 and 43 respectively; and for the curve 40, cos α = 0; for the curve 41, cos α = −0.25; for the curve 42, cos α = −0.5; and for the curve 43, cos α = −0.75. The curves illustrated are for a condition in which the rotor resistance is minimum. The effect of increased rotor resistance, as already indicated, for a constant cos α, is to change the characteristic curve 40 to that illustrated at 40'.

Turning now to FIG. 7, there is shown a block schematic diagram of the inventive control system. The previously mentioned alternator 19, induction motor 20, rectifier 33, and inverter 35 are illustrated in block form with corresponding reference numerals. Although only a single line is shown in the interconnections of the blocks 19, 20, 33, and 35, it will be appreciated that each of these shown lines represents three separate electrical feed lines as shown in FIG. 3.

The control system, in its broader aspects, has three principal elements. One is what is sometimes herein referred to as the demand-torque or shaping network which generates a signal representative of a predetermined-desirable (i.e., demand) torque for the actual speed of the motor. As will be explained in greater detail within, the shaping network may be thought of as a function generator which stores a speed torque envelope to control the motor in the sense that for any given motor speed, it will generate a corresponding signal representative of a desired torque for that speed.

A second major element of the control circuitry generates a signal representative of the actual torque being produced by the motor. An error signal is generated which is representative of the difference between the desired torque signal and the actual torque signal.

A third principal element of the control circuitry sets the motor torque equal to the desired torque for a given speed as indicated by the speed-torque characteristic stored in the shaping network. This is accomplished by setting the firing angle for the thyristors of the inverter according to this error signal. For example, if the desired torque is very much greater than the actual torque being transmitted to the rotor, then the error signal will be such as to cause the firing angle to shift toward the 90° mark; whereas, if the actual torque being produced is larger than the desired torque, then the error signal will be such as to cause the firing angle to shift toward 180° mark, representing a cut off condition. When the desired torque and actual torque are in correspondence, the error signal is just sufficient to place the firing angle at the value demanded by the motor torque-speed characteristic at that speed.

For the case of the present system, in which the induction motor assists the primary transmission only at low speeds, a speed-torque demand characteristic from which is generated the desired torque signal mentioned above, is illustrated in FIG. 6 by reference numerals 45 and 46. It will be observed that for the very low speed range, the torque required by the curve 45 is a constant torque which is equal to the maximum rated torque for the motor. Above a certain speed the electric assist is to provide proportionately less torque; and so there is a linear decrease (illustrated by the line 46) in the output torque as a function of increasing speed up to synchronous speed, indicated by zero slip. It will be apparent to those skilled in the art that the invention is not limited to the particular envelope illustrated; but any desired single-valued function capable of being generated could be used.

Referring now to FIG. 7, a speed-to-voltage converter 48 senses the actual speed of the induction motor 20 and generates a voltage signal representative of this speed. A demand torque network 49 receives the output signal of the speed-to-voltage converter 48 and simulates the function or output signal described by the combined lines 45 and 46 of FIG. 6. That is, for a low input voltage representative of low motor speed, the demand torque network 49 produces a maximum output voltage; and for input voltage levels above a threshold representative of the turning point in the combined curve 45–46, the demand torque network 49 produces a correspondingly diminished output voltage until it becomes zero at synchronous speed.

A torque-to-voltage converter 50 senses rotor current and generates a voltage signal proportional to it. This signal, of course, is representative of the actual motor torque. A comparison circuit 51 receives the output signals of the demand torque network 49 and the torque-to-voltage converter 50, and generates an error signal representative of the difference between the two for the polarity indicated. This error signal is coupled through a diode 52 and is fed into a control amplifier 54. The electric assist actuator, which in the illustrated embodiment is a push switch, which may be mounted on the floor of the tractor 10 (as at 53a of FIG. 1) and actuatable by foot-action of the operator, then energizes a start circuit 54a which also feeds the control amplifier 54. The output of the control amplifier 54 energizes a trigger circuit 56 to set the firing angle of the thyristors in the inverter circuit 35 as determined by the error signal.

Thus, the firing angle of the thyristors in the inverter circuit 35 is a function of a demand for more or less torque. If the demand for an increase in torque is relatively large, as previously mentioned, then the firing angle is shifted toward 90° rather than to 180°. When the actual motor torque is equal to the desired torque for the given motor speed, then the error signal will be reduced to the value to operate the trigger circuit 56 at the required firing angle.

DETAILED CIRCUIT DESCRIPTION

Turning now to FIG. 8A, the motor 20 is shown to include a stator winding 20a and a rotor winding 20b.

The rotor feeds the rectifier bridge 33 which includes six diodes connected in a conventional three-phase bridge rectifier configuration. The previously-mentioned inductor 34 is connected in series between the output of the rectifier 33 and one input of the inverter 35. The output of the inverter 35 is coupled to the input of the stator 20a of the motor 20 as shown; and the thyristors of the inverter 35 are again denoted by an associated Roman numeral which also designates the firing order.

It will be appreciated that each of the thyristors in the inverter 35 as well as the diodes in the rectifier 33 may be shunted with a conventional RC-series network for limiting the rate of change of voltage across these elements and for preventing false firing and for protection.

There is a separate trigger circuit associated with each branch or phase of the inverter network; and these are designated by reference numerals 62, 63, and 64 respectively in FIG. 8A. Each of the trigger circuits 62–64 is identical in circuit configuration, and only one of them will be described in greater detail within.

The previously-mentioned torque-to-voltage converter 50 comprises an arrangement sometimes referred to as a "transductor" including two magnetic cores 66 and 67 and a full-wave rectifier bridge generally designated 68 in series with the secondary of a transformer 69. A load resistor 69a is connected across the secondary terminals of transformer 69. The primary terminal of the transformer 69 is energized by a line-to-line voltage taken between second and third source lines (i.e. phases B and C). As rectified rotor current increases, the cores 66 and 67 begin to saturate on alternate half cycles of the AC voltage received from the transformer 69 thereby coupling into the AC circuit of transductor 50 an AC replica of the rotor current which upon being rectified by the bridge 68 generates a voltage across a resistor 70 proportional to the rotor current.

The previously-described speed-to-voltage converter 48 includes a tachometer 48' in FIG. 8B which senses motor speed and generates a voltage proportional to it. The tachometer assembly includes an internal resistor 74 which forms a voltage divider with a resistor 75. The base of a transistor 76 receives the signal at the junction of resistors 74 and 75. The transistor 76 is provided with a collector load resistor 76a and an emitter load resistor 76b.

The terminal of the resistor 75 not connected to the base of transistor 76 is connected to the movable arm of a potentiometer 77, one fixed terminal of which is connected to a negative supply bus 78 through a fixed resistor 77a. A positive supply bus is designated 79; and a common bus is designated 80. The potentiometer 77 (along with current limiting resistors 77a and 77b in series) is connected between the negative bus 78 and the common bus 80 to provide a reference for the signal fed into the base of the transistor 76.

The signal taken at the collector of the transistor 76 is fed directly to the base of a second transistor 83 having a potentiometer 84 in its emitter circuit. The signal taken from the movable arm of the potentiometer 84 is thus an inverted or decreasing function of the signal fed into the base of the transistor 76 from the tachometer 48'. This circuitry generates the linear portion 46 of the demand torque characteristic of FIG. 6; and the setting of the potentiometer 84 varies the slope of this portion 46 as required by the characteristics of the motor being used. Hence, the system incorporates the capability of translating the juncture of the curves 45 and 46 (that is, with increase or decreased speed) by a mere setting of the potentiometer 84.

A resistor 85 in series with the fixed terminals of a potentiometer 86 is connected from the positive bus 79 to the common bus 80; and a diode 87 is connected with its cathode coupled to the movable arm to the potentiometer 86 and its anode receives the output voltage from the potentiometer 84 through a resistor 87a which serves to clip the voltage fed to the diode. The combination of the diode 87 and the potentiometer 86 serves as a single-limiting network which defines an upper limit beyond which the output signal taken from the potentiometer 84 may not exceed. Thus, the potentiometer 86 defines the traction limit set point, i.e., the curve 45 of FIG. 6 having zero slope. Thus, the signal which appears at the anode of the diode 87 is also the signal which appears at the output of the demand torque network 49 of FIG. 7 and is fed into the comparison circuit 51 thereof.

The comparison means 51 includes a conventional differential amplifier 88 receiving, at its positive input through an input resistor 88c, the signal (from lines X—X of FIG. 8A) generated across the potentiometer 70 of the torque-to-voltage converter 50. A signal return resistor 88d is connected between the common bus 80 and the positive input to amplifier 88. The negative one of the leads X—X is connected to the common bus 80. The differential amplifier 88 receives at its negative input through an input series resistor 88a, the signal at the anode of the diode 87. A resistor 88b connected between the other terminal of resistor 88a and the common bus 80 serves as a signal return resistor for the negative input. The output of the differential amplifier 88 is the previously described error signal representative of the difference between a desired torque for the instant motor speed and its actual torque. A feedback resistor 88e is connected between the output of amplifier 88 and its negative input terminal to set the gain.

The output of amplifier 88 is coupled through a diode 52 (previously identified in the description accompanying FIG. 7) and a resistor 89a to the positive input of a second differential amplifier 89. A resistor 89b is connected between the cathode of diode 52 and the common bus 80 to set the output impedance of the amplifier 88 - diode 52 circuit; and a resistor 89c is connected between the positive input of amplifier 89 and the common bus 80 to define the gain into the positive input terminal. The differential amplifier 89 comprises the previously described control amplifier 54 of the block diagram of FIG. 7. A feedback resistor 89e is connected between the output terminal of amplifier 89 and its negative input terminal to set its gain.

The negative input terminal of the differential amplifier 89 is received through a series resistor 89d from a resistor-capacitor network including a resistor 90 and capacitor 91 connected to the common bus 80. The other side of the capacitor 91 is connected through normally closed contacts 92 (actuated by a relay coil 93) and a variable resistor 94 to the negative bus 78. This network is the start circuit 54a of FIG. 7. The coil 93 is connected in series with the actuator switch 53 and a DC supply voltage, as shown. When the actuator switch 53 is depressed by the operator (that is, it is closed), current flows through the coil 93 to open the contacts 92. When the switch 92 is closed, the capacitor 91 is charged to a relatively negative potential and the output of the amplifier 89 is positive. However, when the switch 92 is opened by closing the electric assist actuator switch 53, the capacitor 91 will discharge through resistor 90, and the negative input of the summing amplifier 89 will return to ground potential. At the same time, the amplifier 89 will amplify the error signal coupled through the diode 52.

The output signal of the amplifier 89 is coupled through a voltage-clipping resistor 89f; and, if positive, the output is limited by means of a Zener diode 95 and this signal is clamped to ground if negative by a diode 96. The output of amplifier 89 is coupled through resistor 89f to the base terminal of three transistors 97, 98, and 99 which act as isolation amplifiers in driving respectively the previously-mentioned trigger circuits 62, 63, and 64. The transistors 97–99 are connected in the emitter follower configuration; and each has an emitter load resistor 97a, 98a, and 99a respectively and a bypass capacitor 97b, 98b, and 99b respectively. The positive voltage from the amplifier 89 is limited by the Zener diode 95 to that necessary to provide complete retarding of the firing angle of the thyristors in the inverter to 180° which will reduce the rotor current to zero. A positive voltage (6v. is cut off) at the output of the amplifier 89 will increase the firing angle (that is, move it closer toward 180°); and zero output voltage produces inverter switch conduction at a 90° firing angle.

The output signal of each of the transistors 97–99 is used to define the positive voltage which biases the cathode of thyristors in the trigger circuit and defines their firing angle relative to the time base provided by, for example, Phase A of the alternator. When the gate potential of the associated thyristors is raised above the cathode potential established by one of the transistors 97–99, then the triggering thyristor will conduct. Hence, as the cathode potential is raised and lowered by its associated transistor isolation amplifier, the firing angle is varied.

Since all of the trigger circuits 62–64 are similar, only one will be described in greater detail, it being understood that the reference voltage for each is as shown in FIG. 8B.

Turning now to trigger circuit 63 of FIG. 8C, a transformer, generally identified by reference numeral 103, has its primary terminal energized by the phase A-to-neutral signal; and there are two secondary windings associated with the transformer 103, designated respectively 104 and 105. The secondary winding 104 has a center tap which receives the output signal of transistor 98, and is hereinafter referred to as the input or control terminal of the trigger circuit.

As previously indicated, the trigger circuit 63 is adapted to trigger thyristor III and thyristor VI of the inverter 35 at a phase difference of 180°. Toward this end, a first pulse transformer, generally designated 106, has its secondary winding 107 connected through a resistor 108 and a diode 109 across the gate-cathode junction of thyristor VI. The pulse transformer 106 has a first primary winding 110 and a second primary winding 111. A diode 112 and capacitor 113 are connected from one terminal of the secondary 104 of transformer 103 to the control input of the trigger circuit; and the junction between the diode 112 and capacitor 113 is connected directly to one terminal of the primary winding 110 of the transformer 106. The other terminal of the primary winding 110 is connected to the anode of a thyristor 116; and the cathode of the thyristor 116 is connected to the trigger control input. The other secondary 105 of the transformer 103 is connected in series with a rectifying bridge, generally designated 117, an inductor 118 and a diode 119 to the gate lead of the thyristor 116. The output of the bridge circuit 117 is also connected to a capacitor 120, the other side of which is connected to the common input bus 80. A diode 121 is connected across the capacitor 120 with its anode connected to the common bus 80.

The other terminal of the secondary winding 105 of the transformer 103 is connected to a resistor 122; and the resistor 122 is connected to the cathode of a diode 123 and one terminal of a capacitor 124. The anode of the diode 123 and the other terminal of the capacitor 124 are connected to the common input bus 80.

The terminal of the secondary winding 104 of the transformer 103 which is connected to the anode of diode 112 is also connected to the anode of a diode 125; and the cathode of the diode 125 is connected to one terminal of the second primary winding 111 of the pulse transformer 106. The other terminal of the winding 111 is coupled to the input control terminal of the trigger circuit through a variable resistor 126.

The trigger circuit for thyristor VI is identical to that for thyristor VI except that the output pulses of the two are 180° out of phase; and it includes a pulse transformer 130 having a secondary winding 131 which is coupled to thyristor VI through a resistor 132 and diode 133. The transformer 130 has a first primary winding 134 and a second primary winding 135. A terminal of the first secondary winding 104 of transformer 103 is connected through a diode 136 to one terminal of the winding 134; a capacitor 136a couples this terminal to the control input of the trigger circuit. The other terminal of the winding 134 is connected to a thyristor 137. The gate lead of the thyristor 137 is coupled to the cathode of the diode 123 through another diode 138 with the cathode of the diode 138 connected to the gate of the thyristor 137. The cathode of the thyristor 137 is connected to the input terminal of the trigger circuit.

A diode 139 has its anode connected to the anode of the diode 136 and its cathode connected to one terminal of the second primary winding 135 of the pulse transformer 130. The other terminal of the primary winding 135 is connected to the control input terminal of the trigger circuit through a variable resistor 140.

Since the operation of each side or section of the trigger circuit 63 is the same, only that portion of the circuit concerned with firing thyristor 116 will be described in detail. It will be understood that each section of all of the trigger circuits operate similarly except for a phase difference which is caused by the voltage chosen to excite the transformer. The primary winding of the transformer 103 is excited by the phase A voltage. It will be appreciated that even though the firing angle, α, is referred against the line-to-line voltage, this voltage bears a constant phase relationship to the line-to-neutral voltage; and so either of these voltages may equally be employed as a trigger reference as long as an adjustment for the phase difference is made.

The capacitor 120 is provided with a constant charging current through the secondary winding 105 of the transformer 103, the full-wave rectifying bridge 117, the inductor 118, the diode 123, and the resistor 122. This charging current produces a linear voltage ramp across capacitor 120; and when this voltage is sufficient to forward-bias the diode 119 and trigger the gate lead of the thyristor 116 (the cathode of which is at a potential determined by its associated isolation amplifier), the thyristor 116 will fire. Since the voltage-timed relationship of the ramp waveform is known, and it bears a constant relation with the phase a voltage, it is used as a time base on which to set the firing angle for thyristor VI.

Assuming that the dotted primary terminal of transformer 103 is positive, then the capacitor 120 is charging in the proper direction to fire thyristor 116; and the diode 123 is conducting to prevent the accumulation of a reverse charge on the capacitor 124 (upon which a similar ramp voltage is built during the negative half of the same cycle). On the previous half-cycle of input voltage, the capacitor 113 had charged through the diode 112; and it now stores charge which will flow through the pulse transformer 106 when the thyristor 116 conducts. This discharge of the capacitor 113 through the pulse transformer 106 produces a pulse having a time duration defined by the volt-time area of the transformer 106. The slope of the top of the pulse is defined by the reflected impedance from the windings of the transformer 106; and the leading edge of this pulse is determined by the capacitor 113.

The total flux change in the core of the transformer 106 is determined by the reset current through its primary 111; and this flux change defines the width of the output pulse which, it will be remembered, is 60°. Hence, adjustment of the variable resistor 126 will vary the current through the second primary winding 111 of the transformer 106; and it, therefore, may be used to set the output pulse width. The pulse transmitted to the secondary 107 is coupled to thyristor VI with the cathode of the diode 109 connected directly to the gate lead thereof, and the other terminal of the secondary winding 107 connected to its cathode.

This trigger circuit allows operation of the system independent of the frequency of operation. If the supply voltage amplitude is varied with frequency, for example if the frequency decreases, the voltage at the secondary terminal of transformer 103 will be reduced thereby decreasing the current charging capacitor 113 and delaying the firing time of thyristor 116. It will also widen the output pulse of the transformer 106 since the volt-time product remains constant; if the voltage is reduced, the time will expand in direct proportion. The voltage, however, must always be of sufficient magnitude to trigger the thyristor. Additional detailed information concerning this trigger circuit may be obtained from a co-pending, co-owned patent application of Magnuson, et al for INVERTER FIRING CIRCUIT filed July 15, 1968, Ser.No. 744,726 and now U.S. Pat. No. 3,515,969.

Referring now to the complete circuit diagram as illustrated in FIGS. 8A-8C, the overall system operation will be briefly described. The bridge 33 rectifies the rotor current; and this current is fed through the inductor 34 to the inverter 35. The output of the inverter is fed back to the stator input which is directly connected to the primary power supply lines; and the amount of power that is coupled back to its stator input (that is, the slip power that is circulated within the motor) is determined by the firing angle of the thyristors in the inverter 35. When the vehicle slows down beneath some predetermined speed, the operator presses the electric actuator 53 which opens the contacts 92 in FIG. 8B and the capacitor 91 will discharge through the resistor 90 thereby raising the voltage level of the negative input of the amplifier 89 from a negative voltage level to ground so that the positive output signal from the amplifier 89 decreases. The drive to the isolation amplifiers 97-99 is thus reduced; and the trigger circuits 62-64 are excited to fire their associated thyristors in the inverter at a firing angle which shifts from 180° toward 90°.

This firing angle is, of course, set by the voltage biasing the cathode of thyristor 116 in the trigger circuit 63. As thyristor 116 is fired by the ramp voltage building up across capacitor 120, the previously-charged capacitor 113 will discharge through the pulse transformer 106 and transmit a pulse to fire its associated thyristor VI.

As the rotor current builds up, the current-to-voltage sensor 50 will generate an increasing signal which is fed to the positive input of amplifier 88. At the same time, as the rotor of the induction motor gains speed, the signal input from the tachometer 48 to the demand torque network will increase. The signal input to the negative terminal of the amplifier 88 will remain constant until the speed exceeds the traction limit; it will then decrease toward zero. As the signal on the positive input lead of the amplifier 88 exceeds the negative signal, the input signal to the positive terminal of the amplifier 89 increases, thereby increasing the output signals of the isolation amplifiers 97-99 which, in turn, increases the bias on the cathode of the thyristors in the trigger circuits and delays the triggering time. As the motor accelerates, the rotor current and torque are controlled by the comparator 88. Consequently, for the speed sensed, the output torque of the assist motor is regulated according to a predetermined characteristic or envelope as stored in the shaping network.

It will be appreciated that a cascade induction motor may be used equally as well as the wound-rotor induction motor described. In this latter case, the output of the second stator would be fed directly to the rectifier 33 rather than having the rectifier 33 coupled into the rotor circuit. The cascade design eliminates the need for slip rings on the rotor. Similarly, in the broader aspects of the present invention, the demand torque function generator need not be that which has been disclosed, namely, one which produces a demand signal which decreases with increasing speed linearly after exceeding a certain threshold speed. For example, if a similar electrical system were used for the primary transmission, then the speed-torque function generator should preferably generate a true reciprocal relation corresponding to the well-known constant horsepower characteristic curve illustrated in FIG. 4. The inclusion of this function generator does, however, allow the system to be adapted to many different purposes; and it permits matching the desired characteristic of the electrical system to the load requirement. It is particularly suitable in the present system wherein the electrical assist is designed to complement a primary transmission; and, therefore, it must be designed to match these characteristics over a certain speed range.

It will be apparent that an overriding clutch should preferably be interposed between the rear wheels and the induction motor in the specific application described so that when the vehicle exceeds the synchronous speed of the motor, it will disengage automatically.

Another contemplated modification of the illustrated system is that the electric assist actuator generate a linear or variable signal as determined by an operator to set vehicle speed. This signal, together with a signal representative of rectified rotor voltage (which is inversely proportional to motor speed) are used as the two inputs to the control amplifier 54; and the demand torque signal is then used as an override or clamping level for the signal set by the operator to define a torque limit beyond which the system will not drive the assist motor for that speed. Of course, if the rotor voltage is used, provision must be made to account for the above-mentioned inverse relation with rotor speed.

Having thus described in detail a preferred embodiment of the present invention, it will be obvious to persons skilled in the art that modifications and equivalent structure other than those already described may be substituted for that which has been disclosed without departing from the principle of the invention; and it is, therefore, intended that all such modifications and equivalents be covered as they are embraced within the spirit and scope of the appended claims.

We claim:

1. A method of regulating the output torque of an induction motor with a line-commutated inverter in its rotor circuit comprising: generating a first signal representative of motor speed; generating from said motor speed signal a second signal representative of a desired output torque for that speed; generating a third signal representative of the actual motor torque; and controlling the conduction angle of the inverter switches such that said actual torque signal approaches said desired torque signal over a predetermined operating range.

2. The method of claim 1 wherein said second-named step comprises: storing in a circuit a desired speed-torque envelope; and driving said circuit with said signal representative of motor speed thereby generating from said circuit a signal representative of a desired torque for that speed.

3. The method of claim 2 wherein said step of controlling said conduction angle of the inverter switches includes comparing said desired torque signal with said actual torque signal; advancing said conduction angle when said desired torque signal is the greater; and retarding said conduction angle when said desired torque signal is the lesser.

4. A system for controlling the torque of an induction motor having a stator and a rotor comprising: inverter means energized by rotor current including controllable switching means for coupling rotor power back to said stator; generator means sensing rotor speed for generating a signal representative of a desired motor torque for the sensed speed; and circuit means receiving the signal of said generator means for controlling the conduction of said inverter switching means in response to said desired torque signal thereby to regulate rotor current so that said motor produces a predetermined torque.

5. The system of claim 4 wherein said generator means includes circuit means for generating said desired torque as a decreasing function of motor speed over at least a portion of the desired speed-torque characteristic for said system.

6. The system of claim 5 wherein said generator means comprises: sensor means sensing motor speed for generating a signal representative thereof; and torque signal generator means receiving said sensor signal for generating a signal representative of a desired system torque for that sensor signal.

7. The system of claim 6 wherein said torque signal generator means includes a torque limiting circuit for generating a constant output signal when said sensor signal indicates a speed below a predetermined speed, and an output signal decreasing from said constant signal when said sensor signal indicates a speed above said predetermined constant speed.

8. The system of claim 7 further comprising first circuit means for setting the level of said desired torque signal which is constant with speed, and second circuit means for independently setting the slope of said desired torque signal which decreases with speed.

9. The system of claim 4 wherein said last-named circuit means includes torque sensor means for generating a signal representative of actual motor torque; comparison means receiving said signal representative of desired torque and said signal representative of actual torque for generating an error signal; and trigger circuit means actuating said switching means of said inverter in response to said error signal to cause said actual torque signal to approach said desired torque signal whereby the torque of said motor is regulated as a function of its speed.

10. In a system for controlling an induction motor with a line-commutated inverter, the method of limiting the output torque thereof comprising: sensing motor speed; generating a desired torque signal representative of a predetermined torque limit for that speed; generating a torque signal representative of actual motor torque; and retarding the conduction angle of the switches in said inverter when said comparison indicates said actual torque is greater than said desired torque.

* * * * *